HIGH CAPACITY PREFABRICATED AIR CONDITIONING SYSTEM

Original Filed May 14, 1971

INVENTOR
WILLIAM F. STOCKFORD
JOSEPH M. GAMEWELL
BY Hunt, Heard & Rhodes
ATTORNEY United States Patent Office Re. 28,246
Reissued Nov. 19, 1974

28,246

HIGH CAPACITY PREFABRICATED AIR CONDITIONING SYSTEM

William F. Stockford and Joseph M. Gamewell, Salisbury, N.C., assignors to Gamewell Mechanical, Inc., Salisbury, N.C.

Original No. 3,721,107, dated Mar. 20, 1973, Ser. No. 143,319, May 14, 1971. Application for reissue Dec. 13, 1973, Ser. No. 424,378

Int. Cl. F25d *19/00*

U.S. Cl. 62—298 6 Claims

Matter enclosed in heavy brackets [ ] appears in the original patent but forms no part of this reissue specification; matter printed in italics indicates the additions made by reissue.

ABSTRACT OF THE DISCLOSURE

An air conditioning system having a capacity in excess of 100–150 tons wherein the compressor, condenser, expansion means, cooling coils, and associated conduits and wiring are prefabricated and prepackaged into a single housing at the factory, hereafter referred to as the "cooling unit," that can be factory charged with refrigerant, if desired, and shipped to the construction site ready to connect to the building ductwork and electrical power system. Air intake and supply sections are set up on either side of the coil section of the cooling unit, and air is passed transversely of the cooling unit, through the coil section. A centrifugal compressor and a conventional condenser unit condition refrigerant which is directly introduced into the coil section through an expansion means and into heat exchange relation with the air to be cooled, without the use of a secondary coolant such as a water chiller and the insulated pipes and air handlers commonly associated with a system of this size. Such a system is used preferably in conditioning air for one or a few large areas as opposed to a plurality of smaller zones.

BACKGROUND OF THE INVENTION

This invention is directed to air conditioning systems of the type adapted for use in cooling and controlling moisture content, and the use of the term "air conditioning system" in this application refers to such a system. Fully prepackaged air conditioning systems known heretofore have been limited to small capacity systems (less than 150 tons) utilizing reciprocating compressors, while centrifugal compressors, associated with larger systems, have been used only in installations wherein elements and components are brought together from various sources and constructed on the site. The reciprocating compressors used in prepackaged systems generally operate as direct expansion units; that is, a unit wherein heat is absorbed directly from the air to be cooled by the expansion or evaporation of a refrigerant through a coil section, the refrigerant having first been compressed and condensed into a high pressure liquid. As a reciprocating compressor reaches a capacity of 100–150 tons, the physical dimensions of the unit become so large and unwieldy that shipment of prefabricated systems is not practical. Accordingly, prepackaged systems currently in use comprise a reciprocating compressor, having a capacity of less than 150 tons, matched with a suitable condenser unit, evaporator coil and heat exchange or cooling coil unit, and including the necessary fans, filters and other components to circulate the air and complete the treatment thereof. The components are made up into one or more prepackaged sections that are transported to the construction site and connected to an air distribution system interconnecting the air conditioning system with various zones that are to be serviced thereby.

On the other hand, as hereinabove recited, air conditioning systems having a capacity exceeding 100–150 tons have heretofore been assembled from separate components shipped from various sources to the construction site and are normally characterized by the use of a centrifugal compressor, which replaces the reciprocating type of the smaller systems. Centrifugal compressors typically are more compact than their reciprocating counterparts and would be suitable for use in prepackaged, direct expansion systems exceeding 100–150 ton capacity; however, for some reason, unkown to the applicant, their use has heretofore been associated only with systems utilizing a secondary coolant system, such as a water chiller, rather than in a direct expansion system, and such a system does not lend itself to prepackaging and transportation.

The reason for secondary coolant systems is more apparent in buildings having many small, isolated spaces to be cooled, such as an office building where multiple air handlers are used and water from a chiller is cheaper to transfer great distances than refrigerant such as freon from a compressor. In such areas a centrifugal compressor and associated condenser condition and deliver refrigerant to a water chiller that is matched to the compressor's capacity for chilling water circulating therethrough to a specified temperature. The chilled water is then circulated through insulated pipes to various air handling stations throughout the building, and the chilled water is used to cool the incoming air by circulating it through coils over which the air passes. The distribution system for the chilled water and the air handlers located in each zone necessarily require that the system be custom built in situ at the construction site. However, even in buildings having large open areas to be cooled by a central air handling system, water chillers are still traditionally used rather than a direct expansion system, so that large prepackaged systems are unknown.

A further disadvantage of prior attempts at prepackaged air conditioning systems lies in the fact that the industry has traditionally attempted to prefabricate the filters, washers, coils, and fans (i.e., the components through which the air passes) as one unit, with the chiller and its electrical controls as a second separate unit and a cooling tower or heat rejection means for the chiller condenser as a third unit. Such a construction saves little time at the construction site, since the electrical wiring and refrigerant conduits are run mainly between the compressor, condenser and coils, and therefore must be connected in the field, rather than in the factory; and it requires an equipment room to be built into the building to house the chiller pumps, piping and associated electrical and mechanical components.

When an air conditioning system is constructed, wired, and charged in the field, problems arise in that higher skilled workers are required, errors are harder to correct, and fabrication is generally more difficult and complicated. Furthermore, these operations, as well as the various quality control checks and tests that must be made, must be performed under field conditions that add to the difficulty of furnishing a system of high quality.

SUMMARY OF THE INVENTION

The subject matter of the present invention, in contradistinction to those described above, is directed to prepackaged, and prefabricated air conditioning systems having a capacity substantially greater than the 100–150 ton upper limit currently available in prepackaged units. At the outset, a centrifugal compressor is utilized which conditions and delivers refrigerant into a condenser unit where the refrigerant is transformed into a high pressure liquid. From the condenser the refrigerant is passed directly through an orificed pressure drop or other suitable expansion means into a heat exchange means such as a cooling coil over which air passes. This is known as a direct expansion type system, rather than the type of system which utilizes a secondary water chilling unit as discussed hereinabove. The components hereinabove listed form a cooling unit or section and are factory prepackaged within an elongated housing with the condenser at one end, the coil unit at the other, and the compressor therebetween. The components are connected by suitable conduits and pipework, completely wired, and, if desired, charged by specially skilled personnel in the factory under the more favorable working conditions therein. Separate fan and filter sections are preselected to match the requirements of the compressor, condenser and coil. After transportation to the construction site, it is only necessary to attach the fan and filter sections to the sides of the cooling unit adjacent the coil section, and connect the prefabricated system into the building ductwork, an operation requiring lesser skilled personnel than the actual fabrication of the unit itself. The unit can be set either on the roof, inside or outside of the building and is more particularly suited for the conditioning of one or more large zones or anywhere there is a requirement for large volumes of conditioned air.

It is therefore an object of this invention to provide an improved air conditioning system having a capacity exceeding 150 tons wherein the system is factory prepackaged as much as possible.

It is another object of this invention to provide a prefabricated air conditioning system of the direct expansion type comprising a centrifugal compressor matched with a condenser unit, expansion means and cooling coils.

It is yet another object of this invention to provide a prefabricated air conditioning system of the direct expansion type utilizing a centrifugal compressor, and eliminating the use of a water chiller.

A still further object of the invention is to provide an improved, high capacity, prefabricated, air conditioning system having a plurality of prepackaged units with a novel arrangement of components in selected units.

Some of the objects of this invention having been stated, other objects will appear as the description proceeds, when taken in connection with the accompanying drawings, in which.

Figure 1:
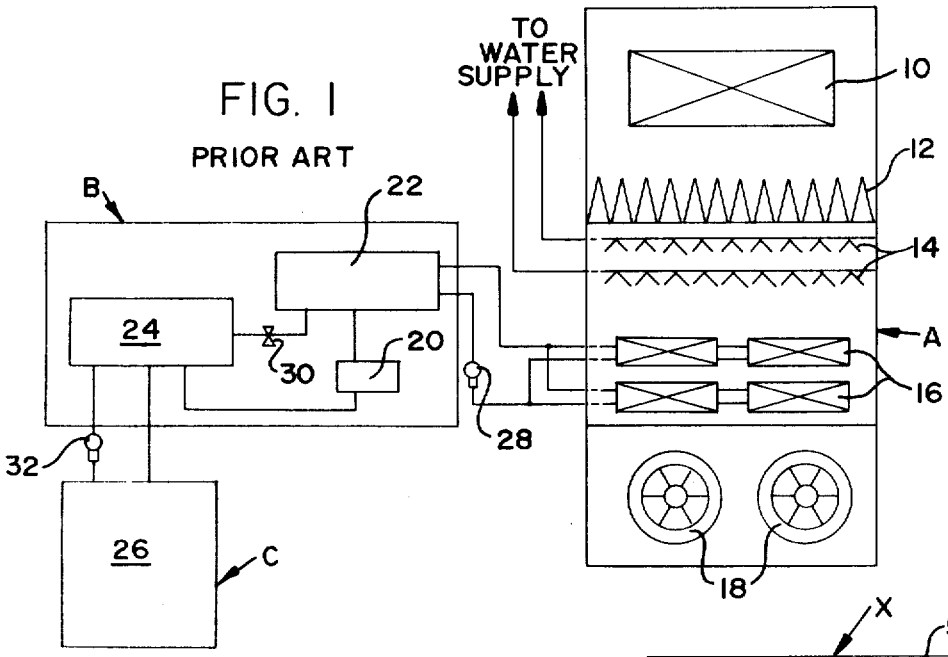
FIG. 1 PRIOR ART
FIG. 1 is an exploded schematic plan view of a conventional high capacity air conditioning system according to the prior art.

Turning now to the drawings, there is illustrated in FIG. 1 the manner in which prior art coil units have previously been factory fabricated for shipment to the site. Such a system is generally divided into at least three units or enclosures A, B, C. Enclosure A includes all of the air handling equipment such as intake air duct 10, filter means 12, washer 14, cooling coils 16, and fans 18 factory assembled into one unit within limits, while unit B represents a chiller comprising an evaporator 22, a centrifugal compressor 20 and a condensing means 24, which are generally assembled together in an equipment room. The third major unit C is a cooling tower 26. Pipes and a pump 28 must be provided between evaporator 22 and cooling coils 16 to circulate water which is cooled in the evaporator and picks up heat from the incoming air in coils 16. A refrigerant passes through evaporator 22 to chill the water, and gas from the refrigerant is removed by centrifugal compressor 20, delivered to a water cooled condenser 24 and back to evaporator 22 through an expansion means 30. Water is pumped from condenser 24 to a water tower 26 and back by a pump 32. Controls (not shown) including starters and interlocks for the pumps, fans, and similar equipment as required for the system are housed within unit A.

So arranged, the undesirable situation arises that since the conduits and electrical circuitry interconnect the chiller, the water tower and the cooling coils, the piping and wiring cannot be done at the factory and considerable time and expense must be exerted at the construction site. An even further disadvantage arises that the size and thus the capacity of the coil unit 16 is severely limited, since enclosure A can be no wider or higher than 12 feet due to highway regulations. Therefore the surface area of the coil unit is limited to 144 square feet.

Figure 2:
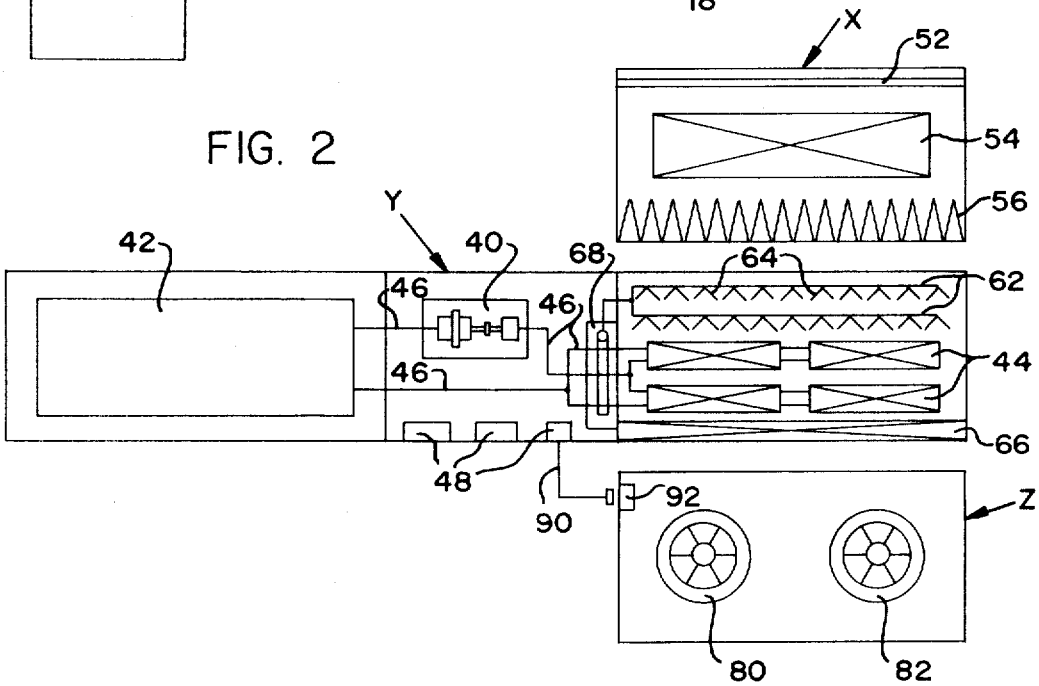
FIG. 2 is an exploded schematic plan view illustrating the present invention.

Referring now to FIG. 2, the air conditioning system according to the present invention includes an intake and filter section within a first enclosure X, a cooling unit within a second enclosure Y having a condenser 42, a compressor 40, a set of cooling coils 44, associated piping 46, and associated electrical wiring (not shown) formed as a prefabricated unit therewith; and a supply section within a third enclosure Z. Enclosures X and Z are attached alongside the cooling coil portion of enclosure Y in operative alignment with the cooling coils, so that the air passes transversely to one end of enclosure Y.

Enclosure X preferably includes a fresh air damper 52 for regulating the introduction of outside fresh air to be mixed with the return air drawn into enclosure X through return air opening 54. This mixture of return air and outside air is then passed through a filtering medium such as Vee-filter 56.

The air subsequently enters cooling unit enclosure Y where it first passes through spray unit 62, if desired. Spray nozzles 64 introduce a spray of water to the air that washes out entrained matter not removed by the filtering action in enclosure X, adds moisture to the air and provides an initial cooling thereof in a conventional manner. Cooling coils 44, having a refrigerant circulating therethrough, reduces the temperature of the air to a prescribed degree, and finally eliminator 66 removes any excess moisture therefrom before the conditioned air enters enclosure Z from whence fans 80 and 82 channel it back to the area to be cooled for distribution therein.

Included also in enclosure Y is a motor control 68 for regulation and control of spray unit 62, and control panels 48. At the construction site, it is only necessary to bolt enclosures X, Y, and Z together, and connect one electrical pigtail 90 running between one of control panels 48 and an electrical connector 92 in enclosure Z for operating the fans 80, 82.

Figure 3:
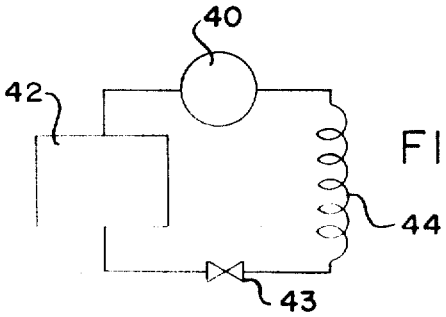
FIG. 3. is a diagrammatic view illustrating the refrigeration flow.

The refrigerant from compressor 40, after passing through condenser 42, passes through an orificed pressure drop means such as valve 43 (FIG. 3), for example, whereupon it is transformed from a high pressure liquid to a low pressure liquid for circulation through cooling coils 66. During the heat exchange process, the refrigerant absorbs heat from the surrounding air passing over and around the coils, changing the refrigerant to a gaseous state, whereupon the gas is drawn off by the centrifugal compressor. Condensing unit 42 can be either the air cooled type or the water cooled type; however, the compressor 40 is of the centrifugal type used in a direct expansion system having a capacity of greater than 100–150 tons, wherein the refrigerant passes through the orificed pressure drop means 43 and directly into the cooling coils 44, with no intermediate water chiller.

It should be obvious to those skilled in the art that the foregoing description of supply section enclosure Z and intake section enclosure X, the components therein, as well as spray unit 62 and eliminator 66 is merely an application of well known concepts. The features serving to distinguish the present system from those previously known, however, reside in the provision of a system having a capacity of greater than 100–150 tons wherein a centrifugal compressor is utilized in a direct expansion system. The smaller size of the centrifugal compressor and the novel rearrangement and grouping of enclosures with the coils being matched in the same enclosure with the condenser and compressor allows the large system to be prepackaged, factory wired and piped, as well as factory precharged. The cooling coils 44 in such an arrangement may easily be extended to lengths of twenty to 25 feet, so that a larger quantity of air can be treated in a given time span without increasing velocity.

While the preceding description has disclosed specific embodiments of this invention in their preferred form, it is to be understood that various changes in detail and arrangement may be made without departing from the spirit and scope of the invention.

What is claimed is:

1. A prepackaged air conditioning system comprising:

an intake section including a first separable enclosure having means associated therewith receiving air to be cooled and treated;

a cooling unit including a second separable enclosure with a longitudinal axis and having a condenser, a centrifugal compressor, and a set of cooling coils therein, said cooling coils being positioned at one end of said enclosure;

a supply section including a third separable enclosure having means associated therewith for supplying air to an area to be cooled; and said first and third enclosures having means associated therewith for attachment to said second enclosure adjacent and alongside said one end in operative alignment with said set of cooling coils, whereby the flow of air past said cooling coils is transverse the longitudinal axis of said second enclosure.

2. A prepackaged air conditioning system comprising:

a. an air intake means including a first enclosure having a first air intake port and a first air exhaust port and a filter receiving means being positioned therebetween;

b. an air cooling means including a second enclosure having a second air intake port and a second air exhaust port said enclosure further having mounted therein a condenser, a centrifugal compressor, and a set of cooling coils, said condenser, compressor and coils being operatively connected together with said cooling coils in the path of the air therethrough;

c. an air supply means including a third enclosure having a third air intake port and a third air exhaust port with an air moving means being positioned therebetween to draw air from said third air intake port towards said third air exhaust port; and;

d. said first air exhaust port being matable with said second air intake port and said second air exhaust port being matable with said third air intake port, whereby, upon assembly, air may be drawn sequentially from said first air intake port through said first, second and third enclosures and exhausted through said third exhaust port.

3. The air conditioning system of claim 2 wherein said cooling coils are positioned between said second air intake port and said second air exhaust port.

4. The air conditioning system of claim 2 wherein said cooling means additionally contains an air washing means positioned adjacent said set of cooling coils.

*5. The system according to Claim 1 wherein said compressor, cooling coils, condenser, and means associated with said supply section for supplying air to an area to be cooled are of such a size and capacity as to provide at least 100–150 tons of refrigeration.*

*6. The system according to Claim 2 wherein said compressor, cooling coils, condenser, and air moving means are of such a size and capacity as to provide at least 100–150 tons of refrigeration.*

References Cited

The following references, cited by the Examiner, are of record in the patented file of this patent or the original patent.

UNITED STATES PATENTS

| | | | |
|---|---|---|---|
| 1,928,386 | 9/1933 | Meyer | 62—505 |
| 2,663,156 | 12/1953 | Baker | 62—510 |
| 2,963,878 | 12/1960 | Beggs | 62—505 |
| 2,690,654 | 10/1954 | Graham | 62—285 |
| 2,992,543 | 7/1961 | Moody | 62—498 |
| 3,524,331 | 8/1970 | Osborne | 62—498 |
| 3,012,762 | 12/1961 | Norris | 165—48 |

MEYER PERLIN, Primary Examiner

U.S. Cl. X.R.

62—304, 498